Oct. 1, 1957     S. POLAZZOLO     2,808,167
THERMOS INSULATED CONTAINER FOR BABY BOTTLE
Filed Feb. 1, 1955
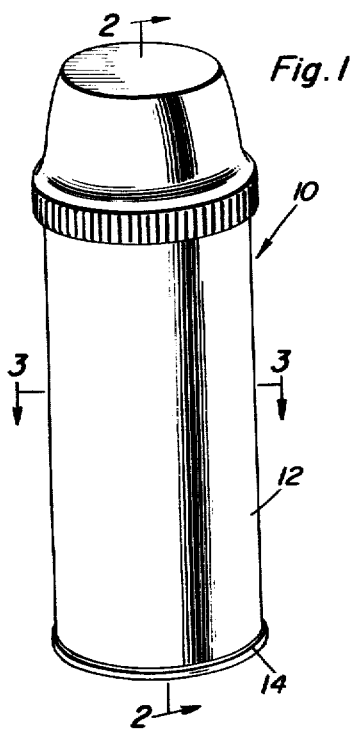
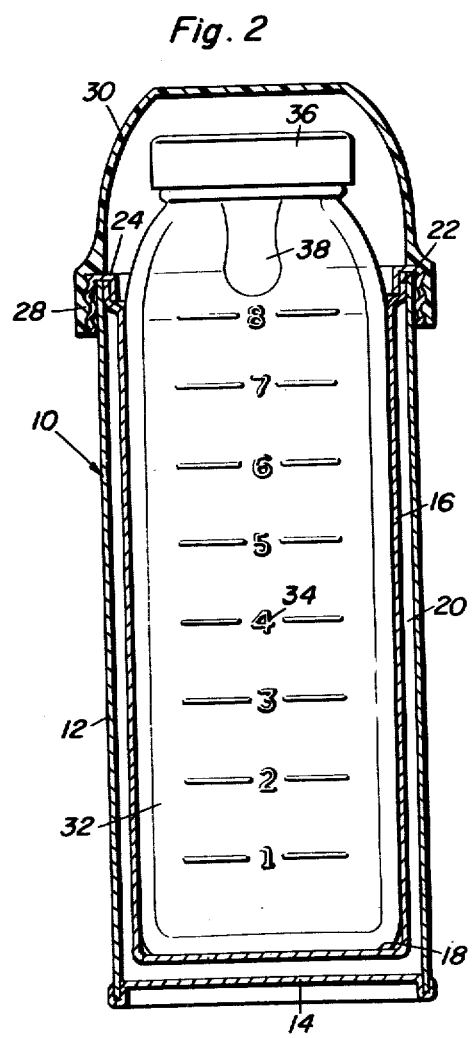
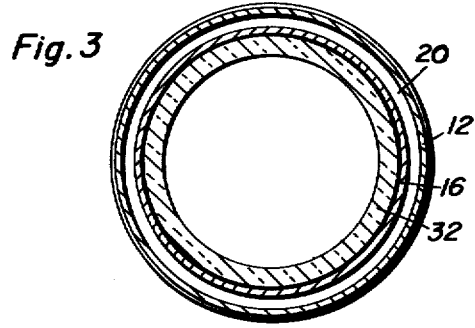
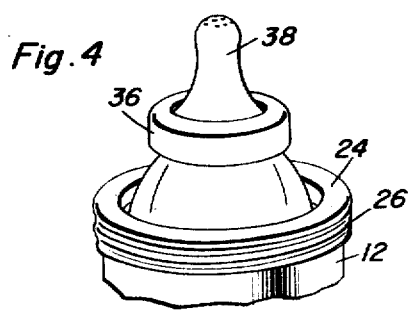
Samuel Polazzolo
INVENTOR.

United States Patent Office 2,808,167
Patented Oct. 1, 1957

2,808,167

THERMOS INSULATED CONTAINER FOR BABY BOTTLE

Samuel Polazzolo, Amsterdam, N. Y.

Application February 1, 1955, Serial No. 485,379

1 Claim. (Cl. 215—13)

This invention relates to that particular type of insulated containers known as Thermos containers, and is specifically useful for holding a baby bottle so that the milk or other liquid food for babies may be retained in the desired and suitable temperature range for feeding of the babies over an extended period of time without the requirement of application of heat for bringing the feeding material to the desired temperature.

In travel, it quite frequently occurs that persons having small babies that must be fed from a bottle find it inconvenient or practically impossible to heat the milk or other liquid food to the desired temperature. There have been attempts to provide devices for heating baby bottles during travel by auto and the like, but such devices are not only impractical but relatively expensive and cumbersome to use. Accordingly, the primary object of the present invention is to provide a Thermos container that will receive the baby bottle with the liquid food therein and will retain the baby bottle and food at the desired temperature so that the baby bottle and the food therein may be employed at any time during a trip without the necessity of resorting to the application of external heat to the baby bottle.

Another object of the present invention is to provide a Thermos container for baby bottles that is provided with a screw cap and a cylindrical inner container having a relatively large cross-sectional area at the open end thereof for receiving baby bottles of conventional dimensions.

Still another important object of the present invention is to provide a container for baby bottles using the "vacuum" bottle principle or the dead air space principle wherein heat will not be transferred therethrough.

Other important objects of the present invention will reside in its simplicity of construction, ease of use, adaptation for its specific purpose and its extremely inexpensive manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the insulated container for baby bottles of the present invention;

Figure 2 is a vertical, sectional view taken substantially upon a plane passing along section line 2—2 of Figure 1 showing the details of construction of the container of the present invention with a baby bottle positioned therein;

Figure 3 is a plan sectional view taken substantially upon a plane passing along section line 3—3 of Figure 1 showing the relationship of the inner and outer cylindrical members and the baby bottle positioned therein; and Figure 4 is a perspective view showing the upper end of the container and baby bottle wherein the baby bottle is in position for use.

Referring now specifically to the drawings, it will be seen that the numeral 10 generally designates the insulated container for baby bottles of the present invention and includes an outer cylindrical member 12 having a bottom 14 thereon and an inner cylindrical member 16 having a bottom 18 thereon. The cylindrical members 12 and 16 are spaced from each other, and the bottoms 14 and 18 are spaced from each other, thereby forming a dead air space as designated by the numeral 20 between the inner receptacle or cylindrical member 16 and the outer receptacle of cylindrical member 12. The upper end of the inner cylindrical member 16 is provided with an integral and outwardly flared flange 22 which generally rests against the inner surface of the outer member 12. A U-shaped annular member 24 is positioned over the open upper ends of the cylindrical members 12 and 16, thereby forming a closure and rigidly securing the inner and outer members 12 and 16 together. The outer surface of the annular member 24 is provided with external threads 26 for receiving internal threads 28 on a hollow cap member 30. It will be seen that the inner member 16 is provided with a cross-sectional area of equal dimensions throughout its length for receiving a milk bottle 32 having the usual indicia 34 thereon together with a screw threaded reversible cap 36 having a nipple 38 associated therewith which in the stored position projects into the bottle 32 and which in its use position is disposed in the manner illustrated in Figure 4. The baby bottle 32 closely fits within the inner member 16 in substantially a telescopic member, and the cap 30 forms a closure for the container 10, thereby insulating the baby bottle 32. The container 10 may be constructed of any suitable materials that may be easily cleaned and relatively inexpensive to manufacture.

The foregoing is considered as illustrative only of the principles of the invention. Further, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

An insulated container for baby bottles, comprising outer and inner cylindrical containers, respectively, spaced apart to provide a dead-air space therebetween, said containers having open ends flush with each other, the open end of the inner container flaring and being of obtuse angled cross-section to fit flush in the open end of the outer container, an annular member of inverted U-shaped cross-section frictionally fitting over said open ends of the containers in straddling relation and having inner and outer sides and a top normal to said sides, the outer side of said member being wider than the inner side and threaded, and a cap for closing said open ends threaded onto the outer side of said annular member and seating flush on the top of the annular member to form a leak-proof seal between said cap and the annular member.

References Cited in the file of this patent

UNITED STATES PATENTS

| | | |
|---|---|---|
| 816,558 | Coffin | Apr. 3, 1906 |
| 957,809 | Steel | May 10, 1910 |
| 1,221,335 | Kline | Apr. 3, 1917 |
| 1,267,292 | Vanstrom | May 21, 1918 |
| 1,305,677 | Weed | June 3, 1919 |
| 1,550,581 | Sherwood | Aug. 18, 1925 |
| 2,038,763 | Schellens | Apr. 28, 1936 |
| 2,220,777 | Othmer | Nov. 5, 1940 |

FOREIGN PATENTS

| | | |
|---|---|---|
| 252,920 | Switzerland | Nov. 1, 1948 |

UNITED STATES PATENT OFFICE
CERTIFICATE OF CORRECTION

Patent No. 2,808,167 October 1, 1957

Samuel Polazzolo

It is hereby certified that error appears in the above numbered patent requiring correction and that the said Letters Patent should read as corrected below.

Column 1, line 16, for "Thermos" read -- vacuum --; lines 31 and 39, strike out "Thermos", each occurence.

Signed and sealed this 10th day of April 1962.

(SEAL)
Attest:

ERNEST W. SWIDER
Attesting Officer

DAVID L. LADD
Commissioner of Patents